US 6,625,275 B1

(12) United States Patent
Miyauchi

(10) Patent No.: US 6,625,275 B1
(45) Date of Patent: Sep. 23, 2003

(54) PRIVATE BRANCH EXCHANGE NETWORK SYSTEM

(75) Inventor: Tatsuya Miyauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/553,040

(22) Filed: Apr. 20, 2000

(30) Foreign Application Priority Data

Apr. 26, 1999 (JP) .......................................... 11-118679

(51) Int. Cl.⁷ ................................................ H04M 3/00
(52) U.S. Cl. ............................. 379/266.04; 379/266.07
(58) Field of Search ........................... 379/225, 266.04, 379/266.07, 279

(56) References Cited

U.S. PATENT DOCUMENTS

| 4,400,587 A | * | 8/1983 | Taylor et al. ........... 379/112.05 |
| 4,737,983 A | * | 4/1988 | Frauenthal et al. ..... 279/266.08 |
| 5,008,930 A | * | 4/1991 | Gawrys et al. ......... 379/265.11 |
| 5,291,552 A | | 3/1994 | Kerrigan et al. ........ 379/266.04 |
| 5,299,259 A | | 3/1994 | Otto ....................... 379/266.04 |
| 5,450,482 A | | 9/1995 | Chen et al. .................. 379/230 |
| 5,469,504 A | * | 11/1995 | Blaha ..................... 379/265.11 |
| 5,524,147 A | * | 6/1996 | Bean ...................... 379/266.03 |
| 5,590,188 A | * | 12/1996 | Crockett ................ 379/265.02 |
| 5,592,542 A | * | 1/1997 | Honda et al. ........... 379/266.05 |
| 5,633,924 A | | 5/1997 | Kaish et al. ............. 379/266.03 |
| 5,754,639 A | | 5/1998 | Flockhart et al. ....... 379/266.05 |
| 5,907,611 A | * | 5/1999 | Dezonno et al. ......... 379/266.1 |

FOREIGN PATENT DOCUMENTS

| JP | 6-237293 | 8/1994 |
| JP | 7-170546 | 7/1995 |
| JP | 116357 | 5/1996 |
| JP | 9-294283 | 11/1997 |
| JP | 2801473 | 7/1998 |
| JP | 11-112666 | 4/1999 |

* cited by examiner

Primary Examiner—Ahmad F. Matar
Assistant Examiner—Quynh Nguyen
(74) Attorney, Agent, or Firm—Foley & Lardner

(57) ABSTRACT

A private branch exchange system facilitates the expansion of extension telephones and extension groups, and can quickly transfer an overflow call from extension telephones supported by one private branch exchange ("PBX") to an extension telephone supported by another PBX. The PBX system is formed such that a plurality of PBXs connected to telephone network and connecting a plurality of extension telephones are composed a PBX with communication line. Each PBX queues an incoming call arriving through telephone network in reception sequence queue common to the overall PBX network. Each PBX scans the distribution sequence queue common to the overall PBX network to select an optimal extension telephone. Additionally, each PBX connects the incoming call to the selected extension telephone when the selected extension telephone is accommodated by the one PBX in which the call is detected, and when the selected extension telephone is accommodated by another PBX, transfers the incoming call to the other PBX through the communication line.

12 Claims, 4 Drawing Sheets

PRIVATE BRANCH EXCHANGE NETWORK SYSTEM

BACKGROUND OF THE INVENTION

1. Field of the Invention

The present invention relates to a network formed with a plurality of private branch exchanges (hereinafter referred to as "PBX"), and more particularly to an improvement when an extension group is formed over more than one PBX.

2. Description of the Related Art

FIG. 1 is a block diagram showing a configuration of a private branch exchange system using a prior art PBX. In FIG. 1, PBX 3 supporting a plurality of extension telephones 4 constituting extension group 5 is provided for each floor level of a building or for each office, for example. Each extension telephone 4 is assigned a unique extension number. CPU 10 is provided inside PBX 3 for performing switching processing, and accesses database 8 which stores extension numbers of extension telephones 4. Trunk circuit 2 is a circuit for relaying external telephone network 1 to PBX 3. External telephone network 1 is a public line constructed by a communication provider, and includes, for example, local call, long distance call, international telephone, and portable telephone networks.

FIG. 2 is a block diagram showing a configuration of a prior art apparatus when a plurality of PBXs are connected through a control device. Extension group 5a managed by first PBX 3a is connected to extension group 5b managed by second PBX 3b through communication line 12 and call distribution control device 13. Call distribution control device 13 transforms an overflow call in extension group 5a to group 5b. The overflow call refers to a state where a call from external telephone network 1 can not be quickly answered since all extension telephones 4a belonging to extension group 5a are busy.

However, according to the apparatus in FIG. 1, since extension group 5 need be closed for one PBX, there is a problem of a limited range of the expansion of telephones 4 and extension groups 5. As a result, existing PBXs can not provide flexible support either for an increase in the number of connected extension telephones 4 by a user of the extension, or for a change in extension groups 5 associated with organizational modifications.

Additionally, according to the apparatus in FIG. 2, since the transfer of the overflow call in extension group 5a to group 5b by overflow call control device 13 is merely secondary processing, a problem exists in that extension telephone 4b to be connected is not instantly determined, resulting in a longer time to keep a calling customer waiting. Furthermore, no close connections among CPU 10a, CPU 10b and device 13 cause a problem of poor maintainability such as difficulties of synchronous database upgrade.

SUMMARY OF THE INVENTION

The present invention solves the aforementioned problems, and it is an object of thereof to provide a private branch exchange network system which facilitates the expansion of extension telephones and extension groups and which can quickly transfer an overflow call from extension telephones supported by one PBX to an extension telephone supported by another PBX.

The private branch exchange network(PBX network) system connected to telephone network 1 of the present invention for solving the aforementioned problems is formed such that a plurality of PBXs 3a and 3b are connected to each other with communication line 6 and accommodating a plurality of extension telephones 4, respectively through private lines. Each of the PBXs comprises first means for detecting an incoming call arriving through telephone network 1 to queue the incoming call in reception sequence queue 7 common in the overall PBX network, second means for scanning a distribution sequence queue 9 supporting extension group 5 including extension telephones accommodated by each of the PBXs to select an extension telephone so as to equalize load, and third means for connecting the incoming call to the selected extension telephone when the extension telephone selected by the second means is accommodated by one PBX in which the incoming call is detected, and when the extension telephone selected by the second means is accommodated by another PBX, for transferring the incoming call to the other PBX through the communication line.

With the configuration as described above, the first means queues an incoming call arriving through telephone network 1 in reception sequence queue 7 common in the overall PBX network to determine the reception sequence of the incoming call. The second means scans distribution sequence queue 9 common in the overall PBX network to select an extension telephone so as to equalize load. The third means connects the incoming call to an extension telephone determined from reception sequence queue 7 and distribution sequence queue 9. Specifically, when the extension telephone is accommodated by one PBX in which the incoming call is detected, the incoming call is connected to the extension telephone, and when the extension telephone is accommodated by another PBX, the incoming call is transferred to the other PBX through the communication line.

The private branch exchange network system of the present invention is configured such that each of the PBXs transfers, when faulty, an incoming call directed to that PBX from telephone network 1 to another PBX through communication path 11 for bypassing and the communication line. With such a configuration, even a faulty PBX may be replaced with another PBX serving as a backup which is connected through the PBX network, thereby enhancing reliability.

Additionally, in the private branch exchange network system of the present invention, each of the PBX is configured such that, when a PBX is faulty, extension telephones accommodated by the faulty PBX are removed from extension telephones to be assigned in the distribution sequence queue with the second means. With such a configuration, even when one PBX is faulty, determination is made in the distribution sequence queue with an extension telephone accommodated by another PBX connected through the PBX network, thereby enhancing reliability as compared with a concentrated type which accommodates a number of extension telephones for one PBX.

As described above, according to the private branch exchange network system of the present invention, an incoming call arriving through the telephone line is queued in the reception sequence queue common in the overall PBX network, and the distribution sequence queue common in the overall PBX network is scanned to select an extension telephone so as to equalize load, and then the incoming call is distributed and connected to the extension telephone. Since the distribution and connection are performed for extension telephones accommodated by a plurality of PBXs connected each other with the communication line, it is possible to connect a new PBX to an existing PBX through a communication line to operate easily as an integrated private branch exchange network system, providing the effect that the system configuration is readily modified and expanded. As in an order reception center of mail order, for example, the system generates no difference in telephone services between a minimum configuration of one PBX and an expanded version of n PBXs, so that it is optimal with no impact on customers. In companies which introduce the system, even distributed or integrated departments due to organizational modifications may be readily supported by integrating PBXs set in the respective departments through communication lines, and an additional effect occurs in that a capital investment can be reduced.

Additionally, even when respective customers are notified of different telephone numbers for allowing the customers to call their nearest PBXS, uniform services can be provided since responding extension telephones are logically selected from the overall system. Since a dedicated communication line of flat rate can be used for the communication line which connects PBXs, telephone rates can be reduced, and the effect is greater especially in collect calls.

DESCRIPTION OF THE PREFERRED EMBODIMENTS

Embodiments of the present invention will be hereinafter described with reference to the drawings.

Figure 1:
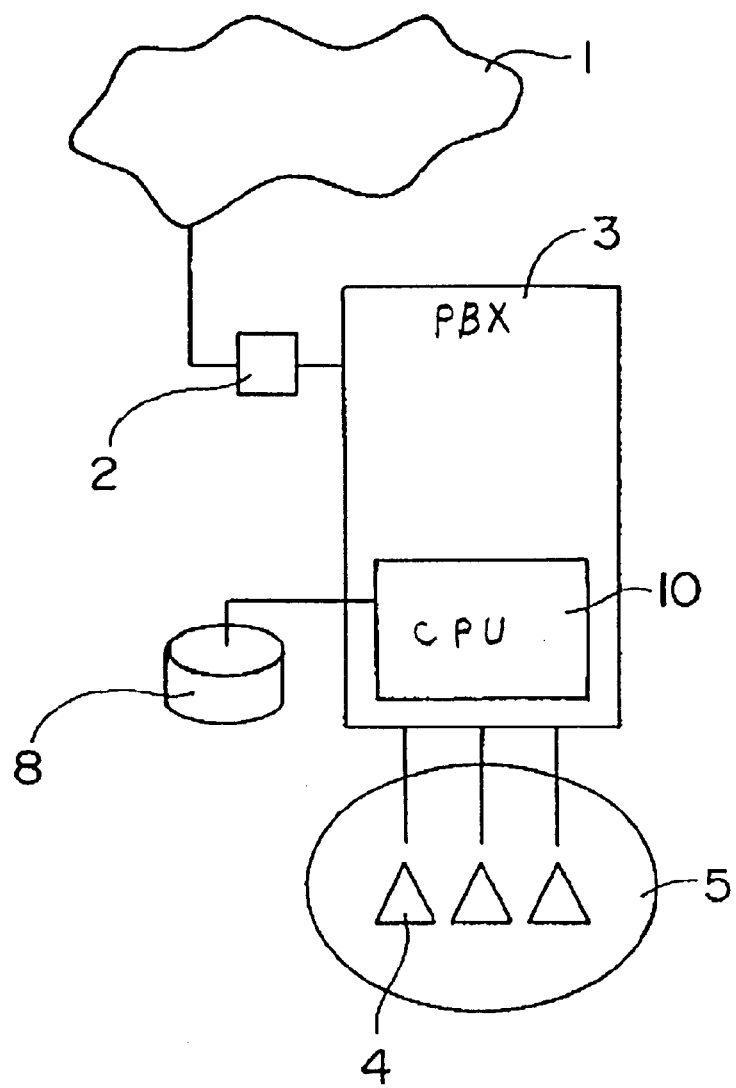
FIG. 1 is a block diagram showing a configuration of a private branch exchange system using a prior art PBX.
Figure 2:
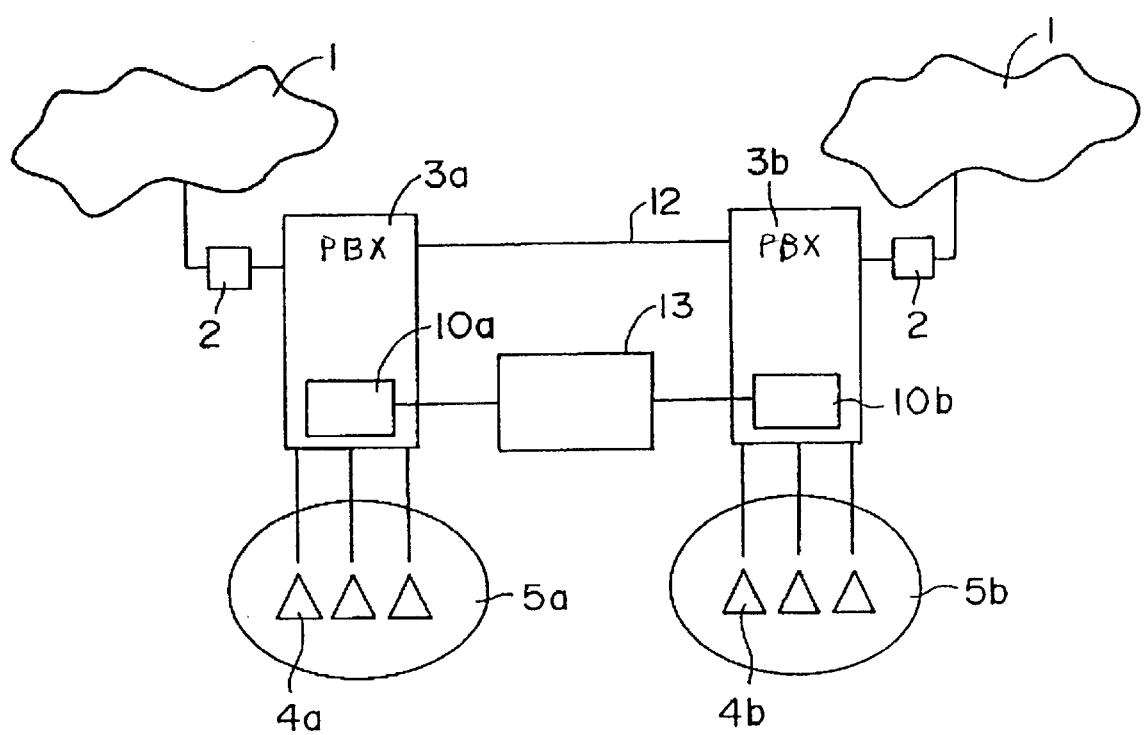
FIG. 2 is a block diagram showing a configuration of a prior art apparatus when a plurality of PBXs are connected through a control device.
Figure 3:
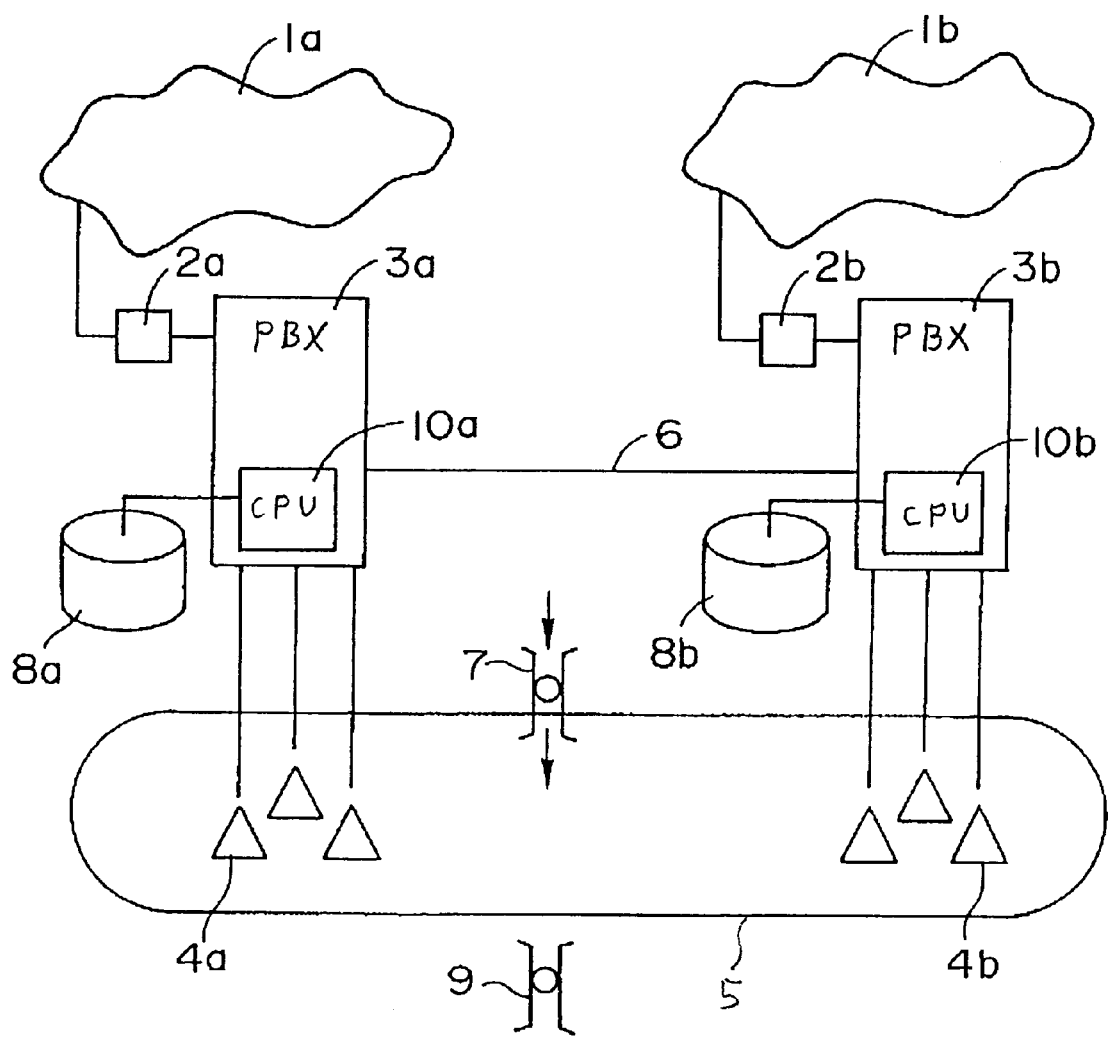
FIG. 3 is a block diagram showing a configuration for explaining a first embodiment of the present invention.

FIG. 3 is a block diagram showing a configuration for explaining a first embodiment of the present invention. It should be noted that elements having the same or similar functions as those described in the foregoing drawings are designated with the same or similar reference numerals and the description thereof is omitted.

In FIG. 3, two PBX 3a and PBX 3b are connected through dedicated communication line 6 to form a PBX network. As communication line 6, a dedicated line provided by a long distance call provider or an optical fiber network is used, for example. PBXs 3a and 3b accommodate external telephone networks 1a, 1b and extension telephones 4a, 4b, respectively. CPUs 10a and 10b for performing distribution and connection functions control switching processing based on databases 8a and 8b.

Extension group 5 is integrally formed for respective extension telephones 4a and 4b of PBXs 3a and 3b which form a PBX network. Reception sequence queue 7 represents the sequence of reception at extensions throughout the PBX network. The queue is a concept corresponding to a queue in mathematics. For example, in the case of a call center, 100 extensions respond to approximately 10,000 incoming calls a day from the outside. There are actually only 10 to 20 persons in charge who have extension telephone 4a or 4b for answering such incoming calls from customers, and the remaining 80 to 90 lines are dealt with by PBXs 3a and 3b. PBXs 3a and 3b deal with the lines such that, in response to an incoming call from a customer, a sound for calling an extension is sent back to the customer through trunk circuit 2 and, when an extension of any person in charge becomes free, the incoming call from the customer is connected to extension telephone 4a or 4b of the person in charge. In other words, reception sequence queue 7 represents the sequence of reception of incoming calls from customers at PBXs 3a and 3b, while distribution sequence queue 9 is used for controlling the sequence of trunk circuit 2 whose incoming call is connected and extension telephone 4 to which the incoming call is connected.

Next, the operation of the apparatus configured as described above is described. The PBX network is assumed to be constructed at an order reception center of a mail order facility. When a customer dials the telephone number of trunk circuit 2a for placing an order, PBX 3a detects the incoming call from telephone network 1a through trunk circuit 2a. Simultaneously, CPU 10a queues the incoming call in reception sequence queue 7 common in the overall PBX network. Next, CPU 10a scans distribution sequence queue 9 which supports extension group 5, and selects one possibly optimal extension telephone from extension telephones 4a and 4b in the whole extension group 5 to distribute and connect the call thereto. The selection of the "optimal" telephone means that the call is connected to one of extension telephones 4a and 4b of a person in charge who has the least work to do at this time, which can equalize load on respective persons in charge.

When the selected one of extension telephones 4a and 4b is accommodated by PBX 3a, trunk circuit 2a is directly connected to extension telephone 4a. When the selected one of telephones 4a and 4b is accommodated by PBX 3b, the call is connected to extension telephone 4b through communication line 6.

Figure 4:
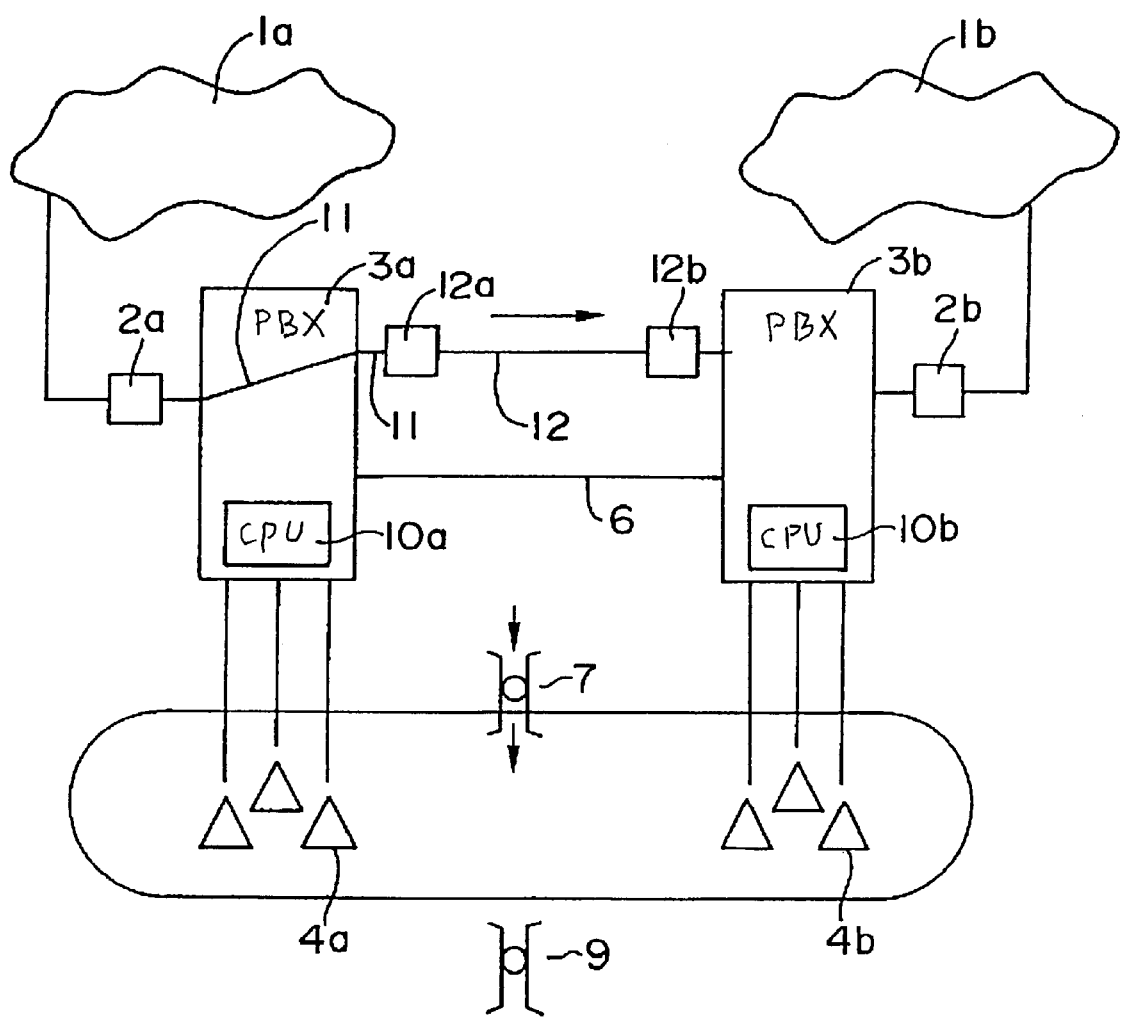
FIG. 4 is a block diagram showing a configuration for explaining a second embodiment of the present invention.

FIG. 4 is a block diagram showing a configuration for explaining a second embodiment of the present invention and illustrates an order reception center of mail order. The difference between FIG. 4 and FIG. 3 is that communication path 11 for bypassing and communication path 12 for connecting PBX 3a and PBX 3b are provided in case CPU 10a becomes faulty. Communication path 12 is provided with relay circuits 12a and 12b connecting to PBX 3a and PBX 3b.

Next, the operation of the apparatus configured as described above is described. When a customer dials the telephone number of trunk circuit 2a for placing an order, PBX 3a detects the incoming call from telephone network 1a through trunk circuit 2a. If an IC is damaged or CPU 10a is faulty due to a power failure or the like at this time, the incoming call is automatically transferred to PBX 3b through communication path 11 for bypassing and communication path 12.

Next, instead of CPU 10a, CPU 10b queues the incoming call in reception sequence queue 7, and distributes and connects the call to extension telephones 4b. Since extension telephones 4a accommodated by PBX 3a are removed from candidates to be distributed, the apparatus has the effect that telephone services can be provided for customers as usual without time delay even when CPU 3a is faulty.

While the aforementioned embodiments show a case where two PBXs 3a and 3b are used to form a PBX network, the present invention is not limited thereto, and three or more PBXs may be used to form a PBX network.

What is claimed is:

1. A private branch exchange network system connected to a telephone network comprising a plurality of private branch exchanges connected to each other with a communication line and accommodating a plurality of extension telephones, respectively through a private line, each of said private branch exchanges comprising:

first means for detecting an incoming call arriving through said telephone network and queuing said incoming call in a reception sequence queue common to said plurality of private branch exchanges;

second means for scanning a distribution sequence queue supporting an extension group including an extension telephone accommodated by each of said private branch exchanges to select one of said extension telephones so as to equalize load; and third means for connecting said incoming call to the selected one of said extension telephones when the one of said extension telephones selected by said second means is accommodated by one private branch exchange in which the incoming call is detected, and when the one of said extension telephones selected by said second means is accommodated by another private branch exchange, for transferring said incoming call to the other private branch exchange through said communication line.

2. The private branch exchange system according to claim 1, wherein each of said private branch exchanges transfers an incoming call directed to one private branch exchange from said telephone network to another private branch exchange through a communication path for bypassing and said communication line when the one private branch exchange is faulty.

3. The private branch exchange system according to claim 1, wherein each of said private branch exchanges removes extension telephones accommodated by one private branch exchange from extension telephones to be assigned in said distribution sequence queue with said second means when the one private branch exchange is faulty.

4. The private branch exchange system according to claim 2, wherein each of said private branch exchanges removes extension telephones accommodated by one private branch exchange from extension telephones to be assigned in said distribution sequence queue with said second means when the one private branch exchange is faulty.

5. A private branch exchange network system connected to a telephone network comprising a plurality of private branch exchanges connected to each other with a communication line and accommodating a plurality of extension telephones, respectively through a private line, each of said private branch exchanges comprising:

a detector apparatus for detecting an incoming call arriving through said telephone network and queuing said incoming call in a reception sequence queue common to said plurality of private branch exchanges;

a selection device for scanning a distribution sequence queue supporting an extension group including an extension telephone accommodated by each of said private branch exchanges to select one of said extension telephones so as to equalize load; and connection apparatus for connecting said incoming call to the selected one of said extension telephones when the one of said extension telephones selected by said selection device is accommodated by one private branch exchange in which the incoming call is detected, and when the one of said extension telephones selected by said second means is accommodated by another private branch exchange, for transferring said incoming call to the other private branch exchange through said communication line.

6. The private branch exchange system according to claim 5, wherein each of said private branch exchanges transfers an incoming call directed to one private branch exchange from said telephone network to another private branch exchange through a communication path for bypassing and said communication line when the one private branch exchange is faulty.

7. The private branch exchange system according to claim 5, wherein each of said private branch exchanges removes extension telephones accommodated by one private branch exchange from extension telephones to be assigned in said distribution sequence queue with said selection device when the one private branch exchange is faulty.

8. The private branch exchange system according to claim 6, wherein each of said private branch exchanges removes extension telephones accommodated by one private branch exchange from extension telephones to be assigned in said distribution sequence queue with said selection device when the one private branch exchange is faulty.

9. A private branch exchange network system connected to a telephone network comprising a plurality of private branch exchanges connected to each other with a communication line and accommodating a plurality of extension telephones, respectively through a private line, a method comprising:

detecting an incoming call arriving through said telephone network;

queuing said incoming call in a reception sequence queue common to said plurality of private branch exchanges;

scanning a distribution sequence queue supporting an extension group including an extension telephone accommodated by each of said private branch exchanges and selecting one of said extension telephones so as to equalize load; and connecting said incoming call to the selected one of said extension telephones when the one of said extension telephones is accommodated by one private branch exchange in which the incoming call is detected, and when the one of said extension telephones is accommodated by another private branch exchange, transferring said incoming call to the other private branch exchange through said communication line.

10. The method according to claim 9, further including the steps of transferring an incoming call directed to one private branch exchange from said telephone network to another private branch exchange through a communication path for bypassing and said communication line when the one private branch exchange is faulty.

11. The method according to claim 9, further including the steps of removing extension telephones accommodated by the one private branch exchange from extension telephones to be assigned in said distribution sequence queue when the one private branch exchange is faulty.

12. The method according to claim 10, further including the steps of removing extension telephones accommodated by the one private branch exchange from extension telephones to be assigned in said distribution sequence queue when the one private branch exchange is faulty.

* * * * *